Patented June 24, 1930

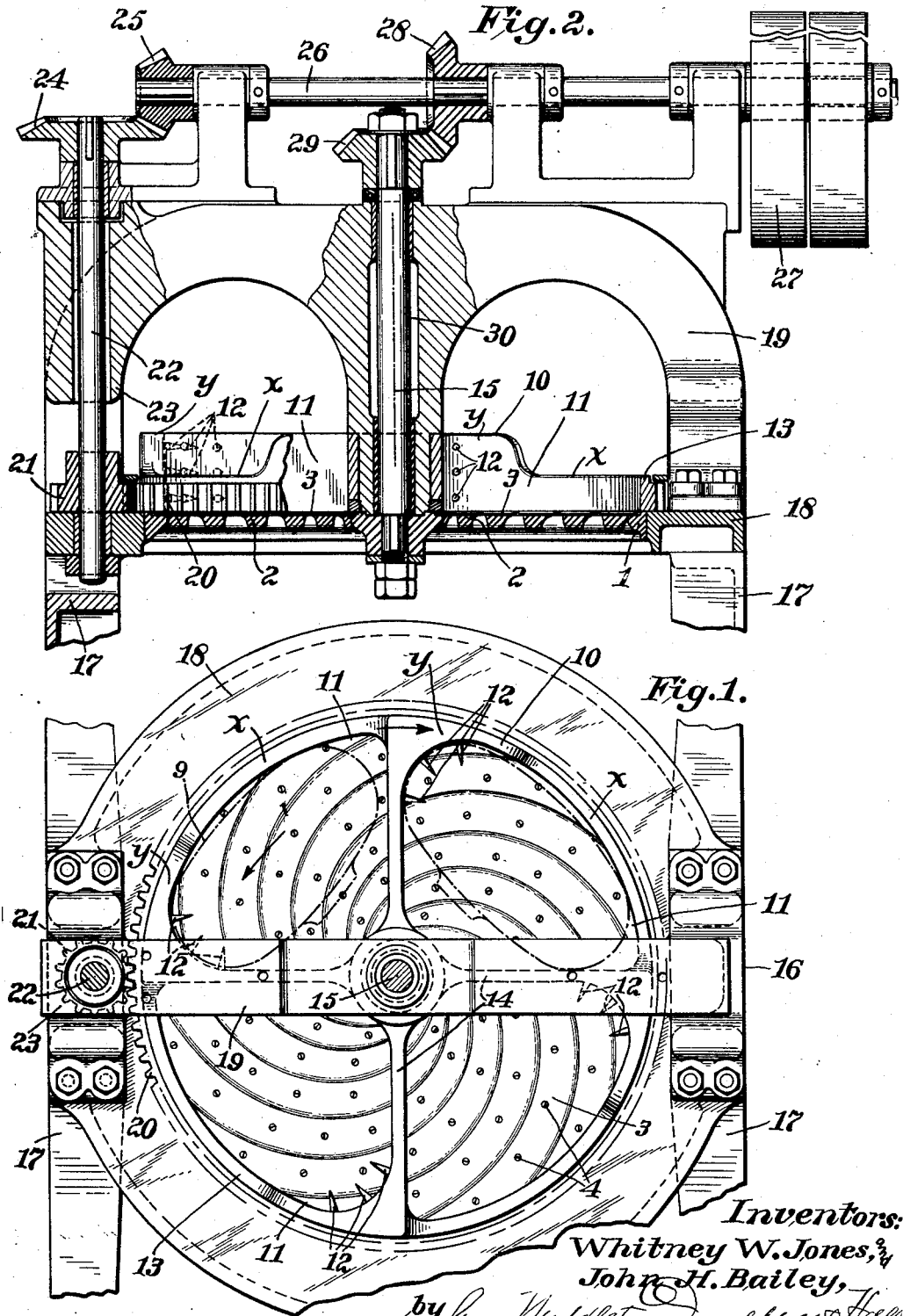

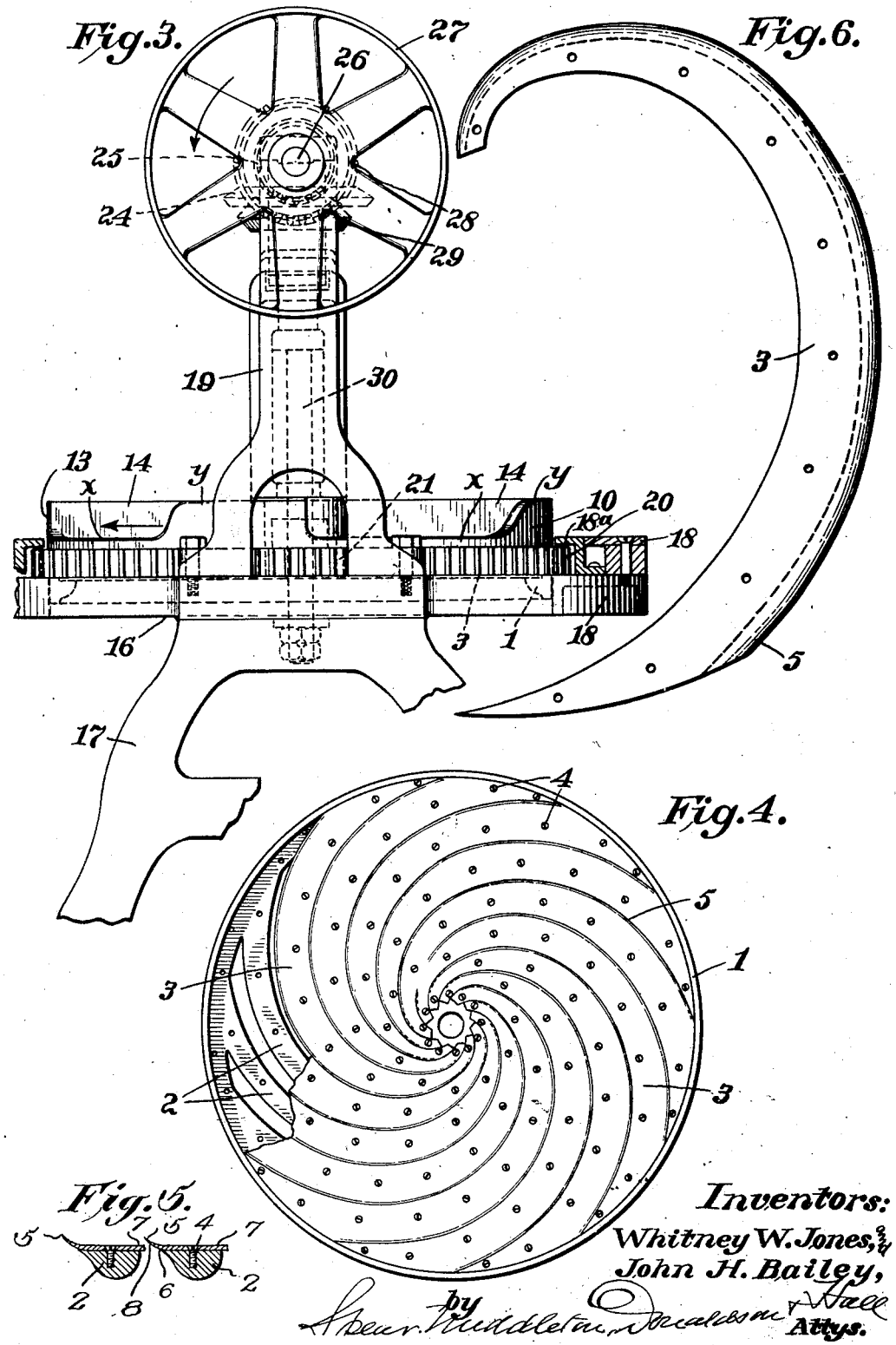

1,766,825

UNITED STATES PATENT OFFICE

WHITNEY W. JONES, OF BALTIMORE, MARYLAND, AND JOHN H. BAILEY, OF PHELPS, NEW YORK

VEGETABLE SLICER

Application filed February 27, 1928. Serial No. 257,249.

The invention relates to improvements in apparatus for slicing vegetables or the like and more particularly it relates to apparatus for slicing cabbages for making sauerkraut.

An object of the invention is to provide novel means for holding and presenting the cabbages or other vegetables to the slicing knife.

A further object is the provision of means for holding and revolving the cabbages in one direction relative to the cutting knife disc, which rotates in the opposite direction.

Another object is the provision of a novel form of slicing knife disc and of means whereby the vegetables may readily be fed to the machine while it is operating.

Other objects will appear hereinafter.

The invention consists in the features, combination, and arrangement of parts hereinafter described and particularly pointed out in the claims.

In the drawings:

Figure 1 is a plan view of my improved cabbage cutter.

Fig. 2 is a front elevation, partly in section, of my vegetable cutting apparatus.

Fig. 3 is an end elevation, looking from the right of Fig. 2.

Fig. 4 is a plan view of the slicer disc formed of a plurality of knives disposed relative to one another, as shown in Fig. 5.

Fig. 5 is a transverse section through two adjacent knives showing their relative position.

Fig. 6 is a plan view of one of the blades or knives mounted upon a spiral spoke of the cutter wheel or disc.

Referring to the drawings, 1 is the slicer disc or knife carrier having a plurality of spirally shaped spokes 2 upon each of which a slicer knife or blade 3 is secured by any suitable means, such as rivets 4. The cutting edge 5 of each knife blade overlaps the spiral spoke of slicer disc 1 as shown at 6 and is deflected upwardly to overlap the rear edge 7 of the adjoining slicer knife, and to provide a space at 8 through which the slices of the vegetable or the like are adapted to pass.

The cabbages or other vegetables 9 are carried in a rotary holder wheel 10 which is disposed immediately above the slicer knife disc 1 and coaxial therewith. The wheels or discs 10 and 1 are rotated in opposite directions, the cabbages being held in recesses or openings 11 in carrier 10 and engaged by spikes 12 at one side thereof, which engage the cabbage at one end to carry it around as the wheel 10 rotates. The spikes 12 cooperate with the upwardly flared cutting edges 5 of the knives to slice the cabbage, the slicings passing through the spaces 8 and below the slicer disc 1 where they may be collected in any suitable way.

The cabbage holder wheel has a rim 13 and spokes 14 of sufficient depth to receive the cabbages in the recesses 11 and to constrain them therein, during the slicing operation.

The cabbage carrier and slicer disc are mounted for rotation about a vertical axis 15 in the supporting frame 16, which comprises supporting legs 17, a guard ring or table 18, and an arched bearing and drive gearing supporting bracket 19.

The cabbage carrier wheel 10 is driven through its peripheral teeth 20 meshing with pinion 21 on shaft 22 mounted in one leg 23 of bracket 19, and carrying bevel gear 24 at its upper end, which meshes with bevel pinion 25 on drive shaft 26, which may be driven by any suitable means, as by pulleys 27.

The slicer disc 1 is driven by the same shaft 26 in a direction opposite to that of the carrier wheel 10, through bevel gearing 28, 29 and shaft 30, to which the slicer disc is rigidly secured.

The cabbages previous to being placed in the machine are subjected to the operation of a coring cutter which forms a spiral shaped cut or groove running axially from end to end of the core. These cabbages, as prepared in this way, are placed one by one in the respective pockets as they come around to the feeding station, and they are positioned by the operator with their axis horizontal and with one lateral rounded side of the cabbage engaging the points or spikes.

One tendency of the action of the knives is to rotate the cabbage about its horizontal axis, but this tendency is resisted by the spikes which hold the cabbage firmly against rotation in any direction, and the resultant of the force so tending to rotate the cabbage as thus held is to draw it down against the knives and thus the cutting goes on with great rapidity and the whole head of cabbage is cut before one revolution of the machine takes place.

Another result of this action is that long slices of the cabbage are cut. This is due to the automatic drawing down of the cabbage by the engagement of the knife therewith while maintained against rotary displacement by the spikes.

It will be noticed that there are a plurality of spikes, arranged in a group and presenting series extending vertically and horizontally. As the cutting goes on and the cabbage is gradually drawn down into the cutter means it fulcrums on these pins, the lowermost pins or spikes being located sufficiently low to maintain control of the cabbage until it is completely consumed.

The previous cutting of the core and the presentation of the cabbage to the cutters with its axis horizontal results in cutting the core into strips.

The spikes in effect provide fulcrum points about which the body of the cabbage turns downwardly as the cutting goes on owing to the downward pull of the knives.

The weight of the cabbage enters into the operation in some degree but in addition to this is the downward pull of the knives upon the body while this is held at its lateral side, by the spikes.

Once the operator places a cabbage in position in a pocket as it comes around no further attention or control need be given or exerted by him. The cabbage is carried away and another empty pocket comes to the operator for receiving its cabbage.

The machine has a capacity to enable two operators to do the feeding, one on each side.

It will be noted that the walls of the carrier member are cut down at the points $x$, at the rim of the wheel, whereas the portion of the wheel adjacent the spikes is of full height as at the portion $y$. This structure facilitates feeding of the cabbages because control of the cabbage can be maintained by the operator until the spikes take hold. The distance the cabbage has to drop after passing through the gateway opening at $x$ is comparatively slight.

This is important not only because the operator can maintain control of the cabbage until taken by the spikes, but also in the case of a cabbage weighing say 8 or 9 pounds the knives are not liable to be damaged as they otherwise would be by dropping the cabbage down the full height of the high portion of the spoke or wheel rim.

The table 18 is substantially flush with the low edge of the wheel at points $x$. There is a guard which is flanged at $18^a$ and overlaps a portion of the gear on the outer side of the carier wheel.

This guard is to shield the gear teeth. It is interposed between the table and the carrier wheel.

While we have shown projecting spikes we do not limit ourselves in this respect as any other means for preventing rotation of the cabbage may be employed within the scope of the invention.

We claim:

1. In vegetable slicing apparatus, a supporting frame, a vegetable holder wheel and a vegetable slicing disc coaxially mounted in said frame for rotary movement in opposite directions to slice the vegetables, means for driving said wheel and disc, said holder wheel having vegetable receiving openings therein in each of which a vegetable is to be placed, and having a rim and spokes forming the walls of said openings with vegetable engaging spikes projecting from the wall of the opening to engage the vegetable to move it in the direction of rotation of the holder wheel and against the slicing disc.

2. In vegetable slicing apparatus, a supporting frame, a vegetable holder wheel and a vegetable slicing disc coaxially mounted in said frame for rotary movement in opposite directions to slice the vegetables, means for driving said wheel and disc, said holder wheel having vegetable receiving openings therein in each of which a vegetable is to be placed, and having a rim and spokes forming the walls of said openings with vegetable engaging spikes projecting from the wall of the opening to engage the vegetable to move it in the direction of rotation of the holder wheel, said slicing disc comprising a wheel having spiral spokes, flat spiral slicing knives carried one on each spoke and having a cutting edge projecting beyond the edge of the spoke and flared upwardly to overlie the rear edge of the next adjacent knife and to provide a space therebetween, said spikes and cutting edges being adapted to cooperate to slice the vegetables.

3. In apparatus for slicing vegetables or the like, a vegetable holder or carrier having a pocket with fixed cabbage engaging means projecting from the wall of the pocket to hold the cabbage against rotating and a cutter knife to cut the cabbage, said carrier and knife being coaxial and having relative rotary movement.

4. Apparatus according to claim 3 in which said cabbage engaging means forms a fulcrum in relation to which the cabbage may be drawn down by the knife.

5. Apparatus according to claim 3 in which said cabbage engaging means is in the form of a spike projecting from the wall of the pocket.

6. Apparatus according to claim 3 in which said cabbage engaging means comprises a plurality of spikes disposed at different heights on the wall of the pocket of the carrier.

7. Apparatus according to claim 3 in which said carrier has a rim provided with a gateway for feeding the cabbages therethrough.

8. Apparatus according to claim 3 in which said cabbage engaging means comprises a plurality of projections disposed at different heights on the wall of the pocket of the carrier.

In testimony whereof, we affix our signatures.

WHITNEY W. JONES.
JOHN H. BAILEY.